UNITED STATES PATENT OFFICE.

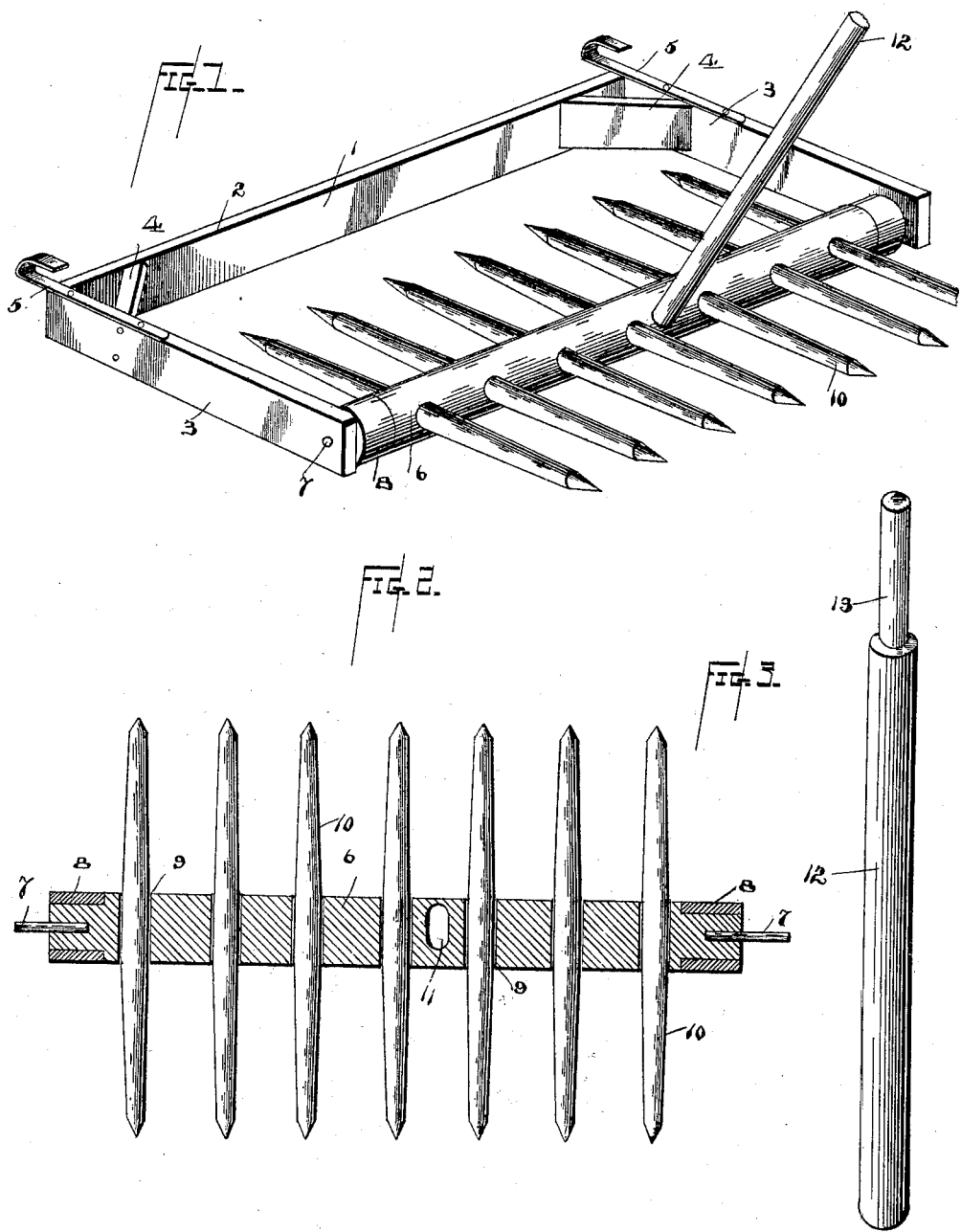

WYATT W. WENTWORTH, OF WATERPROOF, LOUISIANA.

RAKE.

SPECIFICATION forming part of Letters Patent No. 608,737, dated August 9, 1898.

Application filed July 29, 1897. Serial No. 646,356. (No model.)

*To all whom it may concern:*

Be it known that I, WYATT W. WENTWORTH, of Waterproof, in the parish of Tensas and State of Louisiana, have invented certain new and useful Improvements in Rakes; and I do hereby declare the following to be a full, clear, and exact description of the invention, such as will enable others skilled in the art to which it appertains to make and use the same.

This invention relates to certain new and useful improvements in revolving rakes of that class in which the tooth-bar is mounted in a frame for rotation and having means for preventing dumping when desired. The novelty resides in the peculiar construction and the combination, arrangement, and adaptation of parts, all as more fully hereinafter described, shown in the drawings, and then particularly pointed out in the appended claim.

In the drawings, Figure 1 is a perspective view of a rake constructed in accordance with the present invention. Fig. 2 is a longitudinal sectional view thereof, taken through the tooth-bar. Fig. 3 is a detail perspective view of the handle employed for preventing the dumping of the rake.

Referring to the drawings, 1 designates the frame of the rake, which frame is formed of a longitudinal bar 2, having at its ends rearwardly-extending arms 3, the latter projected at right angles to the longitudinal bar 2 and secured to the latter in any suitable manner, braces 4 being employed adjacent to the meeting ends of the bar 2 and arms 3 and extending across the angle formed thereby. A hook 5 is rigidly secured to the upper side of each of the arms 3 at its forward end for the purpose of attaching a team to the frame 1.

Arranged between the ends of the arms 3 and extending parallel with the longitudinal bar 2 is a tooth-bar 6, which bar may be formed of any suitable material, and arranged in each end of the tooth-bar 6 is a spindle 7, the latter passing through the rear ends of the arms 3 and being secured therein by any suitable means. By reason of the spindles 7 it will be seen that the tooth-bar 6 is capable of rotation, and in order to prevent splitting of the ends of the latter bands of metal or other suitable material (designated by 8) are mounted thereon. The tooth-bar 6 is provided throughout its length at spaced intervals with a series of transverse passages 9, and arranged within said passages is a series of rake-teeth 10.

It will be noted at this point that each of the rake-teeth 10 extends an equal distance on opposite sides of the tooth-bar 6, said teeth being secured in the latter in any suitable manner and having their ends pointed for the usual purposes. The teeth 10 may be formed of any suitable material, and in order that the tooth-bar 6 may be held against rotation until the proper time for dumping purposes said bar is provided with an opening 11, extending transversely thereof, but at an angle to the openings 9. This opening is adapted to receive a removable handle-bar 12, having one of its ends reduced, as at 13, for snugly fitting within the opening 11. The latter extends entirely through the bar 6 and opens at opposite sides thereof, and by reason of this it will be observed that after the bar 6 is rotated, so that the accumulated hay or the like on one end of the teeth may be dumped, the handle-bar 12 may be inserted in the opposite end of the opening 11.

The operation of the herein-described rake is as follows: A team having been hitched to the hooks 5 and the handle-bar 12 inserted in the opening 11, the handle is moved sufficiently to give the proper angle of one end of the teeth to the ground. As the rake moves forward it will be observed that the hay or the like begins to accumulate upon the ends of the teeth which are adjacent to the ground, and when a sufficient amount has been gathered thereon the handle-bar 12 is removed from the opening 11, when the tooth-bar will be rotated, and the ends of the teeth 10 which were previously uppermost thereby become positioned in proper relation to the ground to gather the hay and the like thereon. Immediately after the bar 6 has been thus rotated the handle-bar 12 is again inserted in the other end of the opening 11, and remains therein until the now lowermost ends of the teeth have gathered a sufficient quantity of the hay or the like, when said handle-bar is again removed and the operation just described repeated.

From the foregoing description it will be seen that the herein-described improvements provide a rake which is exceedingly simple in its construction and at the same time one which is adapted to be manipulated with great ease and with only an expenditure of minimum energy. Furthermore, the invention may be manufactured at a comparatively low figure and is adapted for raking heavy material, such as weeds and the like, as well as light hay, &c.

Having thus described the invention, what is claimed as new is—

The herein-described rake comprising the frame, the tooth-bar rotatably mounted in said frame and having a series of transverse passages for the rake-teeth, and an opening extending transversely through the said bar but at an angle to the passages for the rake-teeth, teeth held in said passages and extending upon both sides of the bar, and a handle having a reduced end for removable engagement in said opening, all substantially as and for the purpose specified.

In testimony whereof I have signed this specification in the presence of two subscribing witnesses.

WYATT W. WENTWORTH.

Witnesses:
HUGH MARRON,
L. B. ALLEN.